(12) United States Patent
Calvignac et al.

(10) Patent No.: US 6,785,278 B1
(45) Date of Patent: Aug. 31, 2004

(54) METHODS, SYSTEMS AND COMPUTER PROGRAM PRODUCTS FOR HASHING ADDRESS VALUES

(75) Inventors: Jean Louis Calvignac, Cary, NC (US); Marco C. Heddes, Raleigh, NC (US); Clark Debs Jeffries, Durham, NC (US); Ross Boyd Leavens, Cary, NC (US); Gerald Arnold Marin, Chapel Hill, NC (US); Piyush Chunilal Patel, Cary, NC (US); Atef Omar Zaghloul, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,222

(22) Filed: Dec. 10, 1998

(51) Int. Cl.$^7$ .......................... H04L 12/28; G06F 12/00
(52) U.S. Cl. ................ 370/392; 370/395.31; 711/202; 711/208
(58) Field of Search ................ 370/389, 392, 370/390, 400, 401, 351, 352, 356, 410–412, 471, 472, 473, 474; 711/202, 206, 208, 209, 216, 221, 201, 220; 709/102; 707/103; 712/22

(56) References Cited

U.S. PATENT DOCUMENTS

| | | | |
|---|---|---|---|
| 4,215,402 A | | 7/1980 | Mitchell et al. ............ 364/200 |
| 5,230,045 A | * | 7/1993 | Sindhu ....................... 711/203 |
| 5,247,620 A | * | 9/1993 | Fukuzawa et al. .......... 709/245 |
| 5,313,647 A | * | 5/1994 | Kaufman et al. ........... 709/102 |
| 5,390,173 A | * | 2/1995 | Spinney et al. ............. 370/393 |
| 5,414,704 A | * | 5/1995 | Spinney ...................... 370/389 |
| 5,450,604 A | * | 9/1995 | Davies ........................ 712/22 |
| 5,530,834 A | | 6/1996 | Colloff et al. .............. 395/463 |
| 5,555,405 A | * | 9/1996 | Griesmer et al. ........... 707/205 |
| 5,566,170 A | | 10/1996 | Bakke et al. ................. 370/60 |
| 5,584,005 A | * | 12/1996 | Miyaoku et al. ............ 711/206 |
| 5,708,659 A | | 1/1998 | Rostoker et al. ............ 370/392 |
| 5,740,171 A | | 4/1998 | Mazzola et al. ............ 370/392 |
| 5,757,795 A | * | 5/1998 | Schnell ....................... 370/392 |
| 5,802,525 A | * | 9/1998 | Rigoutsos ................... 707/103 |
| 5,860,070 A | * | 1/1999 | Tow et al. ................... 711/216 |
| RE36,462 E | * | 12/1999 | Chang et al. ............... 711/209 |
| 6,014,733 A | * | 1/2000 | Bennett ....................... 711/216 |
| 6,088,758 A | * | 7/2000 | Kaufman et al. ........... 711/100 |
| 6,173,384 B1 | * | 1/2001 | Weaver ....................... 711/216 |

OTHER PUBLICATIONS

*Indexing Method Employing Hashing, IBM Technical Disclosure Bulletin*, vol. 16, No. 3, pp. 694–697 (Aug. 1973).
*Virtual to Real Address Translation Using Hashing, IBM Technical Disclosure Bulletin*, vol. 24, No. 6, pp. 2724–2726 (Nov. 1981).
Khinchin, A.I., *Mathematical Foundations of Information Theory* (New York, 1957).
Knuth, D., *The Art of Computer Programming*, vol. 3, (Massachusetts 1998).

\* cited by examiner

*Primary Examiner*—Hanh Nguyen
(74) *Attorney, Agent, or Firm*—Joscelyn G. Cockburn; Myers Bigel Sibley & Sajovec P.A.

(57) ABSTRACT

Methods systems and computer program products are provided for hashing address values that exhibit banding in a plurality of regions of an address space defined by at least two segments of the address values, by performing at least one of a translation and a rotation of the at least two segments to thereby map the at least two segments from the plurality of regions to one of the plurality of regions.

37 Claims, 6 Drawing Sheets

METHODS, SYSTEMS AND COMPUTER PROGRAM PRODUCTS FOR HASHING ADDRESS VALUES

FIELD OF THE INVENTION

The present invention relates to network routing in general, and in particular to hashing address values for network communications.

BACKGROUND OF THE INVENTION

In network communications, it is often necessary to determine routing paths or other addressing in light of a destination address in a message to be routed. For example, in the Transmission Control Protocol/Internet Protocol (TCP/IP) the destination address may be an IP address which may be utilized to determine the address of the next jump in the route of the message. The IP address is a 32 bit address which identifies the destination of the message. This 32 bit address may be mapped to labels (numbers with fewer bits than the address) so as to increase the speed with which the next address in the route or other address based determinations may be made. Thus, the 32 bit address may, for example, be hashed to 16 bits which are then associated with routing rules. Such a use of a hash function in IP routing is well known to those of skill in the art. For example, U.S. Pat. No. 5,708,659 entitled Method for Hashing in a Packet Network Switching System describes such a routing system.

One problem of hashing occurs with "collisions" of hash values. Ideally, each address would hash to a unique value such that no two addresses result in the same hash values. However, in practice, address values may hash to the same hash value which may result in ambiguity as to which rules are to be utilized to route a message. Thus, further processing is generally required to determine the rule which is to be applied. Accordingly, hash functions which reduce the number of hash collisions are more desirable for routing applications.

Typically, hash functions are one directional in that the address which generates the hash value may not be determined from the hash value. Thus, in general, if a collision occurs the full address which generated the hash value must be utilized and a search restarted to resolve the ambiguity. Such operations may reduce the efficiency of the hash operations in the event of collision.

Examples of various hash functions are utilized in routing systems are described in U.S. Pat. Nos. 4,215,402, 5,247, 620, 5,414,704, 5,530,834, 5,566,170, 5,740,171, and 5,757, 795. Similarly, other hash functions in differing contexts are described in IBM Technical Disclosure Bulletin, Vol. 16, No. 3, pp. 694–69 (August 1973) and IBM Technical Disclosure Bulletin Vol., Vol. 24, No. 6, pp. 2724–2726 (November 1981).

While these hash functions may provide acceptable performance in many routing systems, as routing systems become larger and more complex, hash functions which reduce collisions while still maintaining performance advantages of hashing may become more critical to the performance of the routing system. Furthermore, hashing functions which, together with a complementary function, are invertible may be even more beneficial in that the need to restart a search with the original address may be avoided in the event of a hash collision. Thus, further improvements in hashing functions may still be desirable.

SUMMARY OF THE INVENTION

In light of the above discussion, it is an object of the present invention to provide methods, systems and computer program products for hashing address values.

It is a further object of the present invention to provide such methods, systems and computer program products which reduces hash collisions while providing reduced bits.

It is a further object of the present invention to provide an address hashing function which is invertible.

These and other objects are provided, according to the present invention, hashing address values that exhibit banding in a plurality of regions of an address space defined by at least two segments of the address values, by performing at least one of a translation and a rotation of the at least two segments to thereby map the at least two segments from the plurality of regions to one of the plurality of regions. Furthermore, these hash values may be used for selecting an action from a plurality of actions based on the mapped at least two segments. In particular, the hashed values may be used for selecting an action from a plurality of data network routing actions.

In particular embodiments of the present invention, the translation and/or rotation is provided by dividing an address space defined by the at least two segments of the address values into at least four regions. The values of the at least two segments corresponding to a second region of the at least four regions are translated to a first region of the at least four regions. Values for the at least two segments corresponding to a third region and a fourth region of the at least four regions are flipped into the first region to provide hash values. The third region and the fourth region are regions other than the first and the second regions. The translated and/or flipped values of the segments are then utilized as hash values for address values.

In particular the flipping operations may be performed by mirroring the values of the at least two segments about an axis dividing the first region from the third region to provide first, third region, mirrored values of the at least two segments corresponding to the third region. Values of the at least two segments are mirrored about an axis dividing the first region from the fourth region to provide first, fourth region, mirrored values of the at least two segments corresponding to the fourth region. The first, third region, mirrored values are then mirrored so as to rotate the values about an axis midway between the first region and the third region to provide second, third region, mirrored values. The first, fourth region, mirrored values are also mirrored so as to rotate the values about an axis midway between the first region and the fourth region to provide second, fourth region, mirrored values. The second, third region, mirrored values are mirrored so as to rotate the values about an axis diagonal across the first region and the second, fourth region, mirrored values are also mirrored so as to rotate the values about an axis diagonal across the first region.

Furthermore, the bit values from segments other than the at least two segments may be EXCLUSIVE ORed with the hash values.

In a further embodiment of the present invention, a plurality of hash values may be determined for permutations of segments of the address values and EXCLUSIVE ORed together. A cyclic shift of the bits of the plurality of hash values may be performed prior to EXCLUSIVE ORing the hash values together.

In a further embodiment, the values of the bits from other segments EXCLUSIVE ORed with the hash values are stored as the complement of the hash value.

In still another embodiment of the present invention, the translation and rotation may be performed by determining a first set of bits of the hash value based on the inverted bit values of a first segment of the at least two segments and a second set of bits of the hash value based on the inverted bits of a second segment of the at least two segments if either a most significant bit of the first segment or a most significant bit of the second segment is a logical 1 value. Bits of the first segment other than the most significant bit of the first segment may then be utilized as the first set of bits and bits of the second segment other than the most significant bit of the second segment utilized as the second set of bits of the hash value if the most significant bit of the first segment and the most significant bit of the second segment have the same logical value.

In a specific embodiment, a 16 bit hash values is determined by determining a 14 bit hash value (H[31] through H[18] utilizing the logical operations of:

H[31]=((g AND A[6]) XOR (f AND (NOT B[6]))) XOR C[6]

H[30]=((g AND A[5]) XOR (f AND (NOT B[5]))) XOR C[5]

H[29]=((g AND A[4]) XOR (f AND (NOT B[4]))) XOR C[4]

H[28]=((g AND A[3]) XOR (f AND (NOT B[3]))) XOR C[3]

H[27]=((g AND A[2]) XOR (f AND (NOT B[2]))) XOR C[2]

H[26]=((g AND A[1]) XOR (f AND (NOT B[1]))) XOR C[1]

H[25]=((g AND A[O]) XOR (f AND (NOT B[0]))) XOR C[0]

H[24]=((g AND B[6]) XOR (f AND (NOT A[6]))) XOR D[6]

H[23]=((g AND B[5]) XOR (f AND (NOT A[5]))) XOR D[5]

H[22]=((g AND B[4]) XOR (f AND (NOT A[4]))) XOR D[4]

H[21]=((g AND B[3]) XOR (f AND (NOT A[3]))) XOR D[3]

H[20]=((g AND B[2]) XOR (f AND (NOT A[2]))) XOR D[2]

H[19]=((g AND B[1]) XOR (f AND (NOT A[1]))) XOR D[1]

H[1 8] ((g AND B[0]) XOR (f AND (NOT A[O]))) XOR D[0]

where f=A[7] XOR B[7] and g=NOT f and A[0] through A[7] are bits of one of a first of the four address segments, B[0] through B[71] are bits of a second of the four address segments, C[0] through C[7} are bits of a third of the four address segments and D[0] through D[7] are bits of a fourth of the four address segments. A remaining two bits of the 16 bit has value are determined utilizing the logical operations of H[17]=(D[1] XOR C[1]) XOR (D[7] XOR A[7]) and H[16]=(D[0] XOR C[0]) XOR (C[7] XOR B[7]).

By taking advantage of banding and voids which are typically present in scatter plots of components of address assignments, a hashing function which translates and flips addresses (a triple reflection) may be utilized to provide a hash function which reduces collisions for address distributions which exhibit the banding and voids. Thus, improved performance may be achieved over conventional hashing functions as fewer collisions would require fewer search restarts. Furthermore, because the present invention provides an invertible hash function, ambiguities may be resolved without reverting to the original address and restarting a search.

While the invention has been described above primarily with respect to the method aspects of the invention, both systems and computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

As is described below, the present invention utilizes statistical structures of the typical assignment of addresses within an address space such as the assignment of IP address, Media Access Controller (MAC) addresses and other addresses assigned by system administrators. In particular, the present invention takes advantage of banding characteristics and voids which typically result from the assignment of addresses by system administrators. These banding and void characteristics may be considered in the hashing function such that hash collisions may be reduced.

Figure 1A:
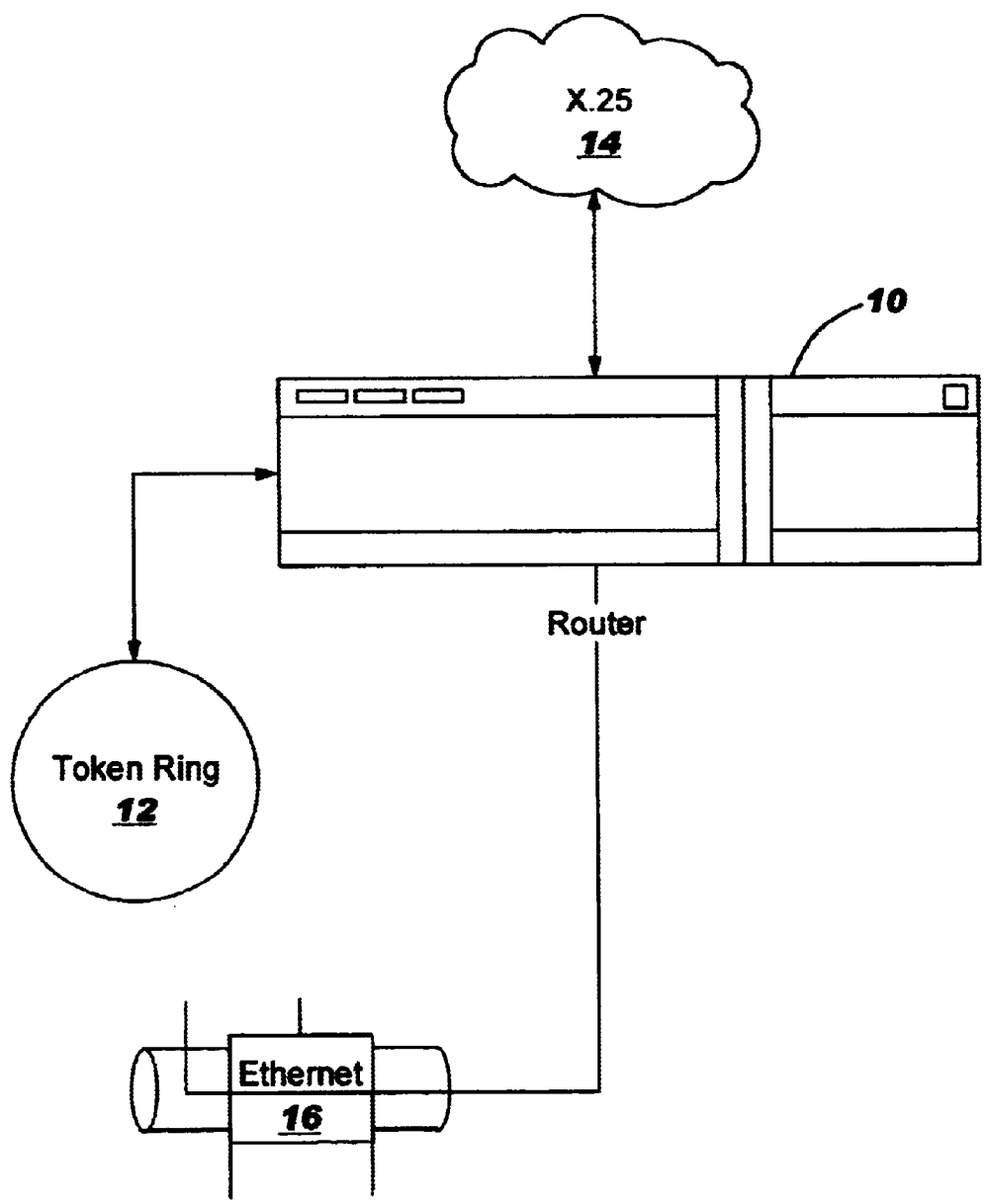
FIG. 1A is a block diagram of a computer network routing system suitable for utilizing the present invention.

FIG. 1A illustrates a routing system which may utilize a hash function according to the present invention. As seen in FIG. 1A, a router 10 may be utilized to route messages between various networks. For example, as illustrated in FIG. 1A, the router 10 may route messages from the token ring network 12 to the x.25 network 14 or from the Ethernet network 16 to either the token ring 12 or the x.25 network 14. Furthermore, the router 10 may perform filtering or other functions based on message addressing or other message specific information. The general operation of a router is well known to those of skill in the art and, therefore, will not be described further herein.

Figure 1B:
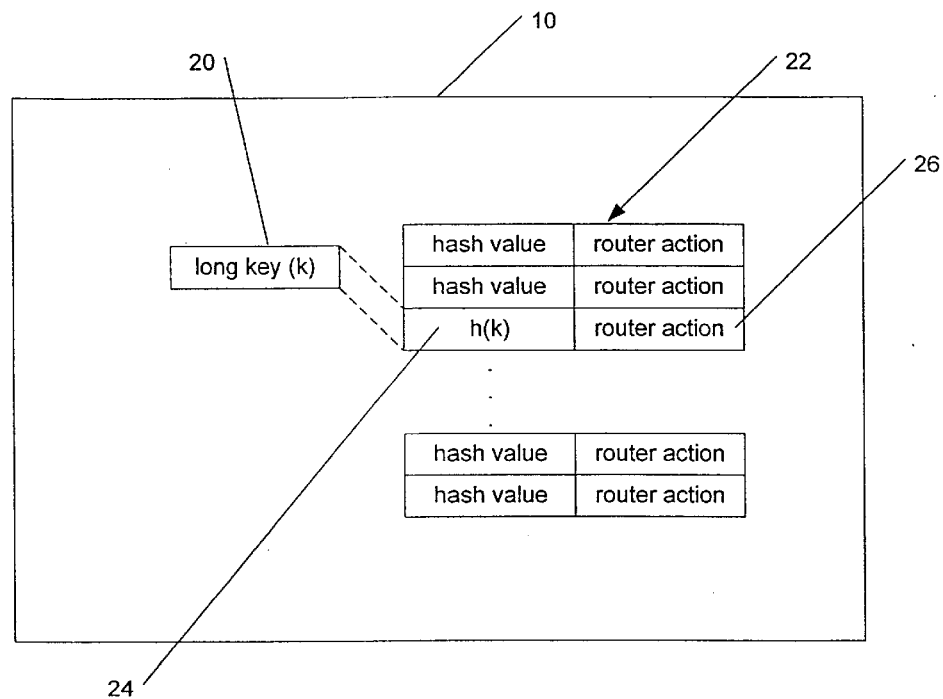
FIGS. 1B and 1C are block diagrams illustrating use of a hash table incorporating the present invention in a routing system such as the routing system of FIG. 1A.

FIG. 1B illustrates how router 10 may use a hash table utilizing a hash function according to the present invention. As seen in FIG. 1B, router 10 may utilize a long key (k) which may be a source address, a destination address, a combination of source and destination address or other message specific information which is then hashed according to the operations of the present invention described herein to provide a hash value h(k). The hash value is then utilized in a look-up table 22 as a hash key 24 to select a router action 26 associated with the hash key 24. Thus, the procedure for selecting the router action 24 may be expedited by reducing the long key k to the hashed key h(k).

FIG. 1B illustrates how a system utilizing the present invention may be utilized to resolve collisions of hash keys. As is seen in FIG. 1B, the router 10 utilizes the hash function of the present invention to hash the long key 20 to a hash value and then utilizes that hash value as a hash key 24 in look-up table 22. However, in look-up table 22 in FIG. 1B, there are two router actions associated with hash key 24, router action A 26' and router action B 26". Because the present invention provides the complement h' (k) to the hash value h(k), the complement h'(k) may be utilized to resolve the ambiguity between router action A 26' and router action B 26". Thus, the look-up table 22 would include the complement function h'(k) associated with each router action which would then be used as further key 30 or 32 to select between router action A 26' and router action B 26".

Figure 1C:
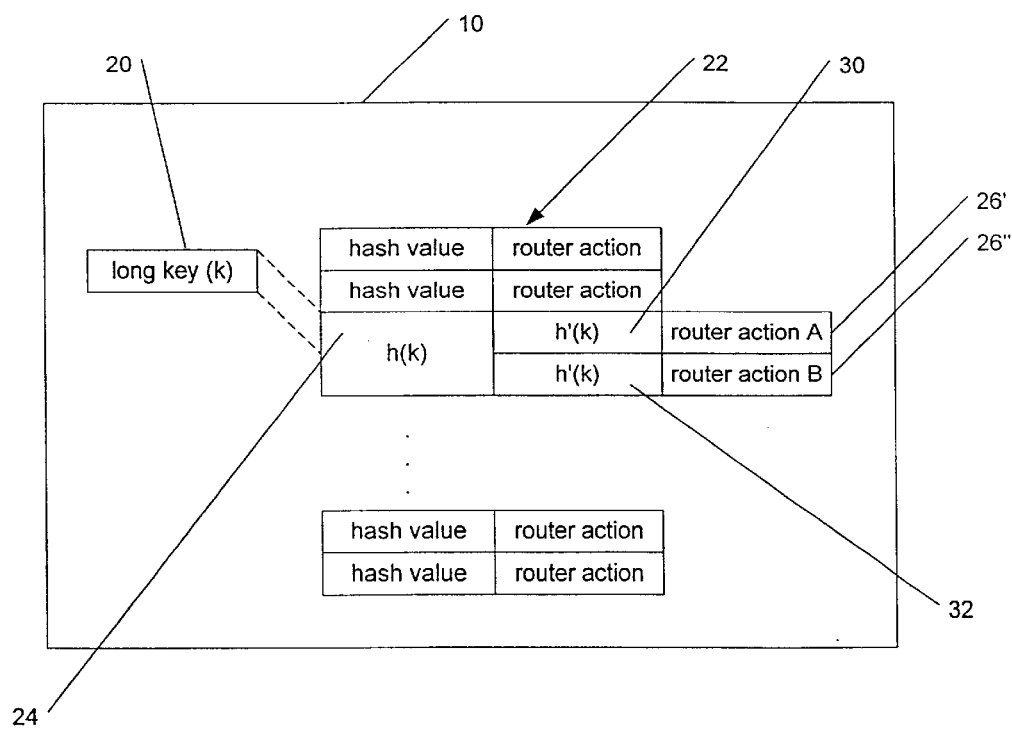

While the present invention is described with respect to the routing system of FIG. 1, the present invention should not be construed as limited to a particular routing system. Furthermore, as is described in further detail below, the hashing function of the present invention may be utilized with addresses of any number of bits. The present invention is also described herein with reference to address bits, however, such term is used in a generic sense as referring to a collection of bits which define a space which may be hashed. Thus, for example, the present invention may be beneficially utilized with any bit schemes which exhibit the banding and void characteristics exemplified by IP addresses. For example, those skilled in the art of using hash functions in data encryption will recognize that the hash function described herein might be chained for use in verification checks when scatter plots of data to be encrypted have band or void structures. Those skilled in the art of database searches will also recognize the utility of a low collision hash function as described herein for application to data with some analogous pattern of bands or voids. In addition, routing actions are only examples of decisions which could be expedited by a table of hashed keys with few collisions.

Operations of the present invention will now be described with respect to the flowchart of FIG. 2. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
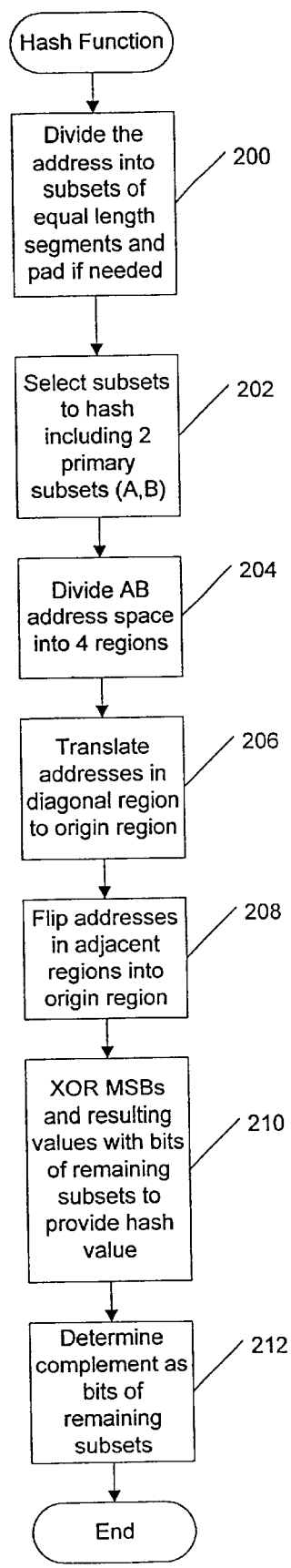
FIG. 2 is a flow chart of operations according to the present invention.

Referring now to the flowchart of FIG. 2, operations of a hash function according to the present invention are illustrated. As seen in FIG. 2, an address is segmented into four segments or subsets of equal length (block 200). In the context of an IP address, the address may be segmented into four 8 bit segments, A.B.C.D. Two of these segments are then selected as the primary segments to hash to define an 8 bit by 8 bit address space (block 202) and two other segments are selected as the remaining segments to hash. In the present example, the two selected primary segments may be segments A and B and the remaining segments C and D. Preferably the two segments which form the address space (the primary segments) are the address segments which have the most variation. While in the present example, all four segments are utilized, where more than 32 bits are involved, only a portion of the segments may be utilized. Thus, for example, for a 48 bit address, four of the six possible 8 bit segments may be used for the hash. Various choices of four of the six segments lead to different 16 bit hashes which can be combined using bit-wise XOR to produce a final hash value.

The address space defined by A and B is then subdivided into four quadrants, an origin region consisting of the 7 bit region of the AB address space adjacent the origin of the (A,B) address space (the origin region), the 7 bit address space where the most significant bits of A and B are both logic "1" value (the diagonal region), and the two 7 bit regions where the most significant bits of A and B are logic "1" and logic "0" and logic "0" and logic "1" respectively (the A adjacent region and the B adjacent region) (block 204). Addresses which fall into the diagonal address space are translated from the diagonal region to the origin region (block 206). Such a translation in the present example may be accomplished by replacing the most significant bits of both A and B with logic "0" or truncating these address bits which translates an address in the diagonal region to the origin region.

The address values in the A adjacent region are "flipped" into the origin region (block 208) as follows. The address values are first flipped into the origin region by mirroring the addresses around the boundary between the origin region and the A adjacent region to provide first mirrored values, second, by mirroring the first mirrored values around the diagonal line of combinations with A=B to provide respective second mirrored values and finally, by mirroring the second mirrored values about an axis parallel to the A axis and halfway from the A axis to the boundary between the origin region and the A region.

Such a triple flipping operation on the A region cal also be expressed as follows. Any point in the A region has coordinates $(0, A_6, \ldots, A_0, 1, B_6, \ldots, B_0)$. The first flip yields $(0, A_6, \ldots, A_0, 0, \sim B_6, \ldots, B_0)$ where "$\sim$" denotes bit reversal. The second diagonal flip then yields $(0, \sim B_6, \ldots, \sim B_0, 0 A_6, \ldots, A_0)$. The third flip then yields $(0, \sim B_6, \ldots, \sim B_0, 0, \sim A_6, \ldots, \sim A_0)$. In the present example, the initial point is 8+8=16 bits, however, the same sequence of operations could be executed in any dimension. Furthermore, the goal is to map the A region into the origin region so that the horizontal bands of points become vertical bands of points. Other related sequences of geometric operations could have this same effect.

Similarly, a point in the B region of the form $(1, A_6, \ldots, A_0, 0, B_6, \ldots, B_0)$ is flipped three times to become $(0, \sim B_6, \ldots, \sim B_0, 0, \sim A_6, \ldots, \sim A_0)$ in the origin region. Thus, the 16 bit (A,B) values are hashed to a 14 bit value. More generally, $2n$ bits are hashed to $2(n-1)$ bits.

To return the 14 bit hash value to a 16 bit value (which would decrease the hash collisions), the MSB's of A and B may be used to form the least significant bits of the 16 bit hash value by XORing these values with the MSB bit values from the other segments C and D and then XORing that result with the XOR of lower order bits of C and D. In general, XORing bits is a good hash technique. This comes from the following fact. Suppose a fair coin and a biased coin are simultaneously flipped. Suppose the value of the fair coin is used to either keep or reverse the value of the biased coin. The final value of the biased coin is, therefore, random. Likewise, suppose the value of the biased coin is used to either keep or revers the value of the fair coin. Then the final value of the fair coin is random.

The goal of the present invention is to improve upon simple XORing of bits in A.B.C.D by using a very first step mapping A,B values into a subset of A,B values which distributes initial scatter plots with bands and voids more uniformly in the subset (the above origin quadrant). After this condensation, XORing values in any standard way preserves the randomness of the scatter plot so obtained.

As described above, the result of the translation and "flipping" of the addresses from the three regions to the origin region is to reduce the 16 bit value A.B to a 14 bit value. These 14 bits are then EXCLUSIVE ORed with the 7 least significant bits with respective ones of the remaining segments of the address C and D (block 210). These 14 bits may then be combined with the two bits derived from the MSB of A and B to provide a 16 bit hash value for A.B.C.D. The XORing with the remaining bits further reduces collisions in that address values with the same A and B would have differing hash values based on the C and D XOR and, therefore, not collide. While a specific XORing example has been provided, the present invention should not be construed as limited to a specific XORing as other XORing operations may also be used which preserve the randomness of the initial operations of flipping of coordinate values which converts scatter plots with bands and voids into a subspace scatter plots which are more random.

Thus, a hash value may be provided which converts the vertical and horizontal bands of address in the A and B address space to a more compact cross pattern in the origin region of A and B. The inclusion of C and D further reduces the likelihood of a hash collision by incorporating all 32 bits into the hash function. Furthermore, as is seen in FIG. 2, the complement of the hash value may also be provided so that the hash function with its complement becomes invertible (block 212). The complement of the hash function is a 16 bit value corresponding to C.D. By contrast, consider a hash function defined by squaring a 32-bit number to produce a 64-bit number then selecting the middle 16 bits. There is no complement for this hash.

Finally, with respect to FIG. 2, as will be readily understood by those of skill in the art in light of the present disclosure, the reflections and translations may be performed in any sequence or simultaneously.

Figure 3:
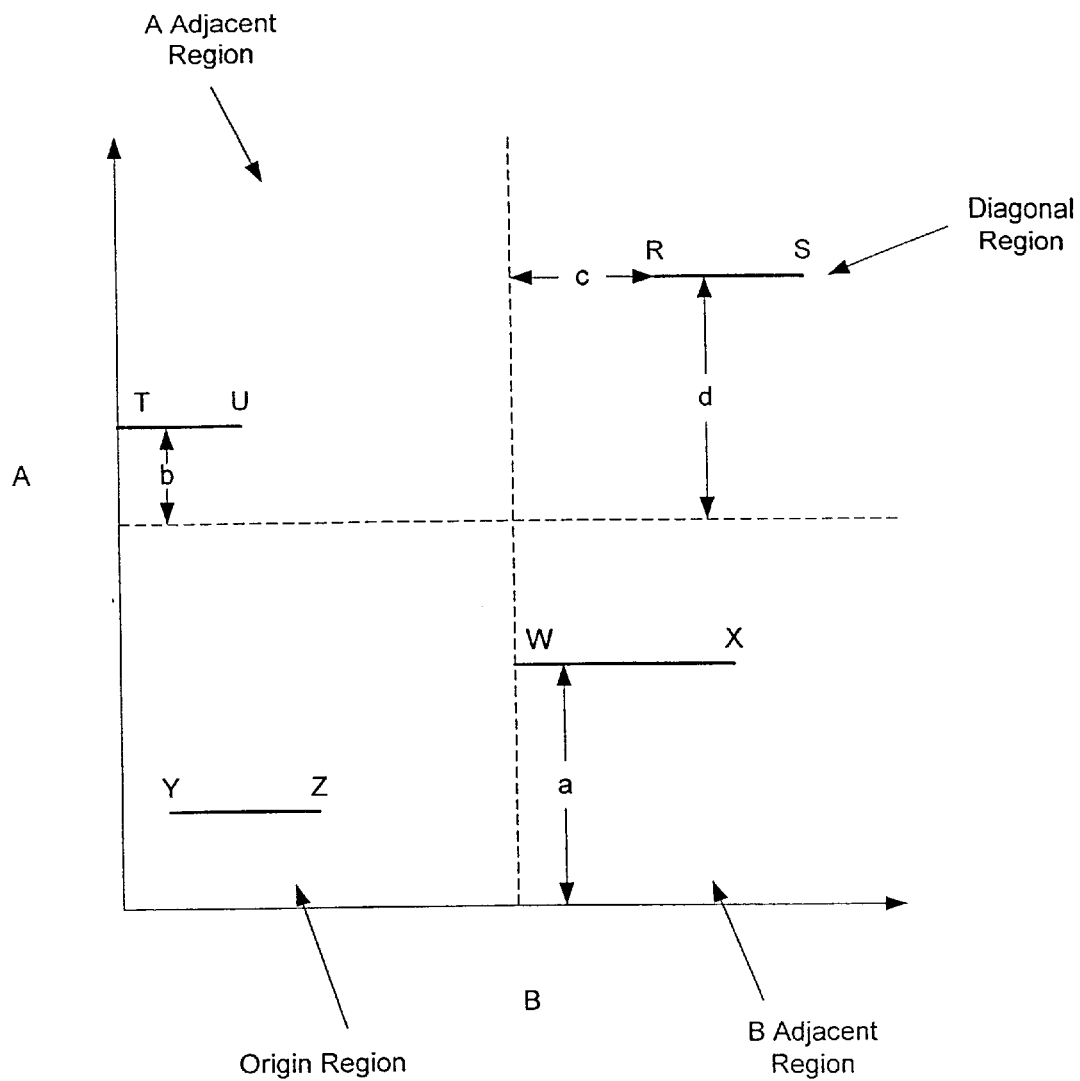
FIG. 3 is a graph of statistical variations in typical Internet Protocol (IP) addresses.
Figure 4:
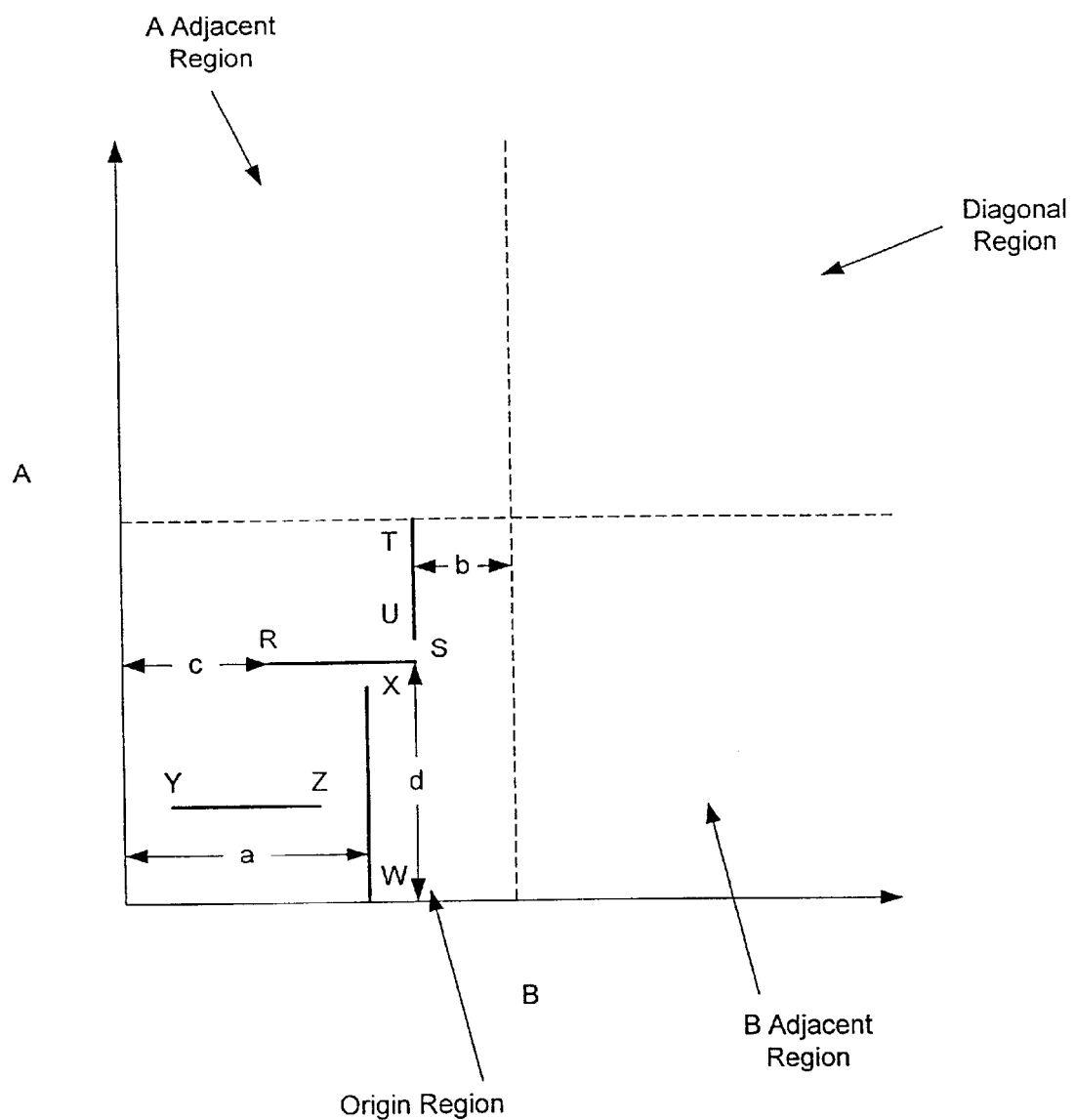
FIG. 4 is a graph of the hash values resulting from utilization of the present invention to hash the IP addresses of FIG. 3.

FIGS. 3 and 4 illustrate a scatter plot of addresses in AB space in FIG. 3 and, in FIG. 4, how those addresses would translate to the origin region (H space) according to the flipping and translation operations of a hash function of the present invention. The relative locations of the line segments are illustrated by dimensions a, b, c and d in FIGS. 3 and 4. As seen in FIG. 3, a horizontal band defined by points R and S exists in the diagonal region, a horizontal band defined by the points T and U exists in the A adjacent region, a horizontal band defined by points Y, Z exists in the origin region and a horizontal band defined by points W and X exists in the B adjacent region.

FIG. 4 illustrates the result of the translation and flipping operations of the hash function of the present invention. As seen in FIG. 4, the line segment R and S is translated to the origin region. The line segment T and U becomes a vertical line segment in the origin region. The line segment W, X which is a horizontal segment in the B adjacent region becomes a vertical segment in the origin region. The line segment Y, Z in the origin region is unchanged. Thus, the hash function of the present invention fills voids in the origin with bands from the other regions. Furthermore, these bands are less likely to collide when hashed to the origin because the differing translation of the bands from differing regions form a "+" pattern rather than simply direct translation, thus reducing the collision points to the cross-over point between the bands. If the banding is predominantly in one direction (the illustrated bands are all horizontal), then some of the bands will be rotated when hashed while others will not. The same result occurs if all bands are initially vertical. Real IP traces, for example, show such bands in various dimensions which are generally horizontal or vertical but not both. This differing treatment will have the effect of reducing the likelihood that a band from one region will translate onto a band from another region because a band of one of the regions would be rotated.

As a particular example of a 32 bit address implementation of the present invention (such as a IP address) where A and B are selected as the primary subsets of the address which are most likely to incorporate variations, the hash function h(A.B.C.D)=H[31] ... H[16] of the present invention becomes:

H[31]=((g AND A[6]) XOR (f AND (NOT B[6]))) XOR C[6]

H[30]=((g AND A[5]) XOR (f AND (NOT B[5]))) XOR C[5]

H[29]=((g AND A[4]) XOR (f AND (NOT B[4]))) XOR C[4]

H[28]=((g AND A[3]) XOR (f AND (NOT B[3]))) XOR C[3]

H[27]=((g AND A[2]) XOR (f AND (NOT B[2]))) XOR C[2]

H[26]=((g AND A[1]) XOR (f AND (NOT B[1]))) XOR C[1]

H[25]=((g AND A[0]) XOR (f AND (NOT B[0]))) XOR C[0]

H[24]=((g AND B[6]) XOR (f AND (NOT A[6]))) XOR D[6]

H[23]=((g AND B[5]) XOR (f AND (NOT A[5]))) XOR D[5]

H[22]=((g AND B[4]) XOR (f AND (NOT A[4]))) XOR D[4]

H[21]=((g AND B[3]) XOR (f AND (NOT A[3]))) XOR D[3]

H[20]=((g AND B[2]) XOR (f AND (NOT A[2]))) XOR D[2]

H[19]=((g AND B[1]) XOR (f AND (NOT A[1]))) XOR D[1]

H[18]=((g AND B[0]) XOR (f AND (NOT A[0]))) XOR D[O]

H[17]=(D[1] XOR C[1]) XOR (D[7] XOR A[7])

H[16]=(D[0] XOR C[0]) XOR (C[7] XOR B[7])

where f=A[7] XOR B[7] and g=NOT f. The complement of the hash values h' (A.D.C.D) H[15] ... H[0] then becomes:

H[15]=C[7]

H[14]=C[6]

H[13]=C[5]

H[12]=C[4]
H[11]=C[3]
H[10]=C[2]
H[9]=C[1]
H[8]=C[0]
H[7]=D[7]
H[6]=D[6]
H[5]=D[5]
H[4]=D[4]
H[3]=D[3]
H[2]=D[2]
H[1]=D[1]
H[0]=D[0]

H[15] ... H[0] is the complement because, from H[15] ... H[0] all of the values of A.B.C.D may be derived. For example, because D[0], D[1], D[7], C[0], C[1] and C[7] are known from the complement, using H[17] and H[16] the values of A[7] and B[7] may be obtained. From A[7] and B[7], f and g may be obtained and then knowing f, g and C[0] ... C[6] and D[0] ... D[6] allows determination of the remainder of the bits of A[0] ... A[6] and B[0] ... B[6]. Thus, if a collision occurs in the first 16 bits H[31] ... H[16], the remaining 16 bits H[15] ... H[0] may be used and it may not be necessary to revert to the original 32 bits to start a new search. Thus, if the original hash value does not resolve between multiple actions, the complement in combination with the original hash value may be used to further select the action.

Figure 5:
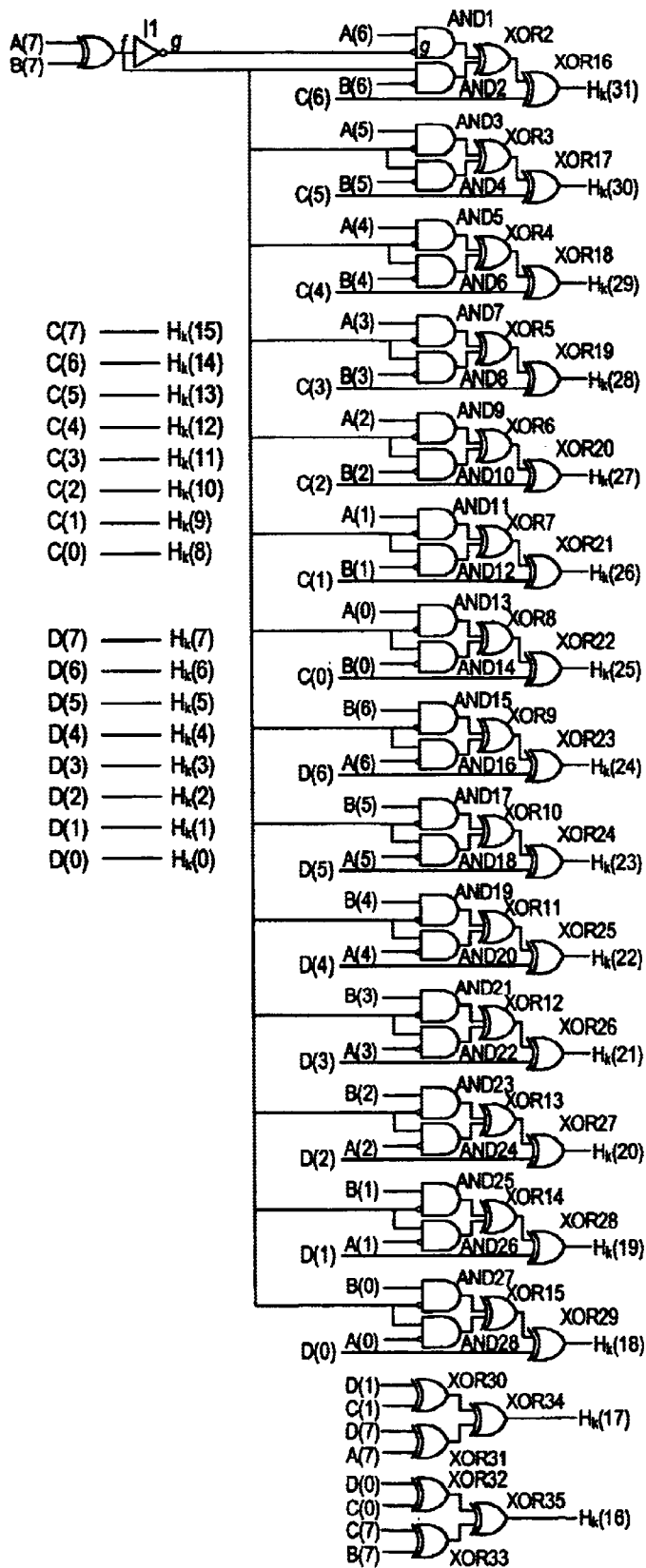
FIG. 5 is a schematic diagram of a circuit suitable for carrying out the present invention for an IP address.

A circuit implementing the above hash determination is illustrated in FIG. 5. As seen in FIG. 5, XOR1 provides f and inverter I1 provides g. These values are then provided to AND1 through AND28 which AND either f or g with a corresponding bit of A or B or its complement as described above. The outputs of pairs of AND1 through AND28 are then XORed in XOR2 through XOR15 and the output of these XOR operations are XORed with corresponding C bit values or D bit values in XOR16 through XOR29 to provide the hash values H[31] ... H[18]. H[17] and H[16] are provided by XOR30 through XOR33 which XOR the respective bits as described above and XOR34 and XOR35 which XOR the outputs of XOR30 through XOR33. As is further seen in FIG. 5, the values H[15] ... H[0] correspond to the bit values of C and D.

While the present invention has been described with respect to a single hash operation, as will be appreciated by those of skill in the art, the hash function may be furthered by calculating multiple hash values for the various permutations of A, B, C and D. Thus, 4 factorial combinations may be determined and then XORed together to further reduce collision of hash values.

However, in a preferred embodiment, the hash function described above may be augmented by determining hash values of two or more and preferably six permutations of A, B, C and D, then cyclic shifting bit values successive amounts in the several resultant hash values and then XORing the shifted bit values to provide a final hash value. Thus, for example, in the first selected permutation of A.B.C.D, no shift would be used. In the second selected permutation, a one bit shift would be used, and so on. Such a shift may be achieved, for example, by utilizing a shift register to store and shift by various amounts the hash values prior to EXCLUSIVE ORing the shifted values.

As will be further understood by those of skill in the art in light of the present disclosure, the present invention need not be limited to 32 bit values but, for example, may be extended to include 48 bit values. For example, in a MAC address A.B.C.D.E.F, the hash value may be determined by calculating the hash as described above for h(A.B.E.F), or any four of the six components, preferably, the four components with the most variation in a MAC address.

Similarly, source and destination addresses may be combined to provide h(S) XOR h(D) where S and D are A.B.C.D for the source address and A.B.C.D for the destination address. Furthermore, the results may be invertible if the full map J defined by J(S.D) is defined as h(S) XOR h(D).h' (S) XOR h' (D).h(D).h' (D). Also as described above, a cyclic shift in the low order bits may be used to avoid hashing S.D and D.S to the same values.

A further advantage of the present invention is that if an address value has less than a desired number of bits, the remaining bits may be padded with logic "0" values and then hashed. These "padded" bits remain at the end of the hash value. Thus, for example, the 32 bit key A.B.C.dddd0000 hashes to (h(A.B.C.dddd0000), h' (A.B.C.dddd0000)) with the last four bits of h' all 0. Thus, any number of bits may be hashed utilizing the present invention by padding the bits with 0's to obtain the hash value.

As will be further understood by those of skill in the art, the present invention may also be expanded to be used with other numbers of bit values, for example, 64 bit values hashed to a 32 bit value, 16 bit values hashed to an 8 bit value, etc ... Accordingly, the present invention should not be construed as limited to any particular numbers of bits.

While the present invention has been described with respect to specific logic gates and functions, as will be appreciated by those of skill in the art, the present invention may be implemented in any number of ways so as to achieve the same logical function as is described herein. Accordingly, the present invention should not be limited to any particular set of logic gates but is intended to cover all combinations of components which are arranged to achieve the hash function of the present invention. For example, rather than using AND gates AND1 through AND28 and XOR gates XOR2 through XOR15, a multiplexer could be utilized which selects between the inputs of A, ~A, B and ~B based on A[7] and B[7]. Furthermore, these functions may be carried out serially or in parallel or combinations of serial and parallel. As will also be appreciated by those of skill in the art, the logical operations of the present invention may be carried out as software operations computer instruction which program a general purpose computer or other data processing system. Thus, the present invention may be utilized or implemented in any method or system which performs the geometric manipulation which takes addresses occurring in scatter plots of pairs of components with bands and voids into subspaces wherein address points are more uniformly randomly distributed. Well-known XOR and shift operations of any type can, thereafter, be employed to complete the hash.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of hashing address values that exhibit banding in a plurality of regions of an address space defined by at least two segments of the address values, the method comprising the steps of:

dividing an address space defined by the at least two segments of the address values into at least four regions;

translating values of the at least two segments corresponding to a second region of the at least four regions to a first region of the at least four regions to provide hash values for address values if the values of the at least two segments correspond to the second region;

flipping the values of the at least two segments corresponding to a third region and a fourth region of the at least four regions into the first region to provide hash values for address values if the values of the at least two segments correspond to one of the third region and the fourth region and wherein the third region and the fourth region are regions other than the first and the second regions; and utilizing the translated and flipped at least two segments as hash values for address values.

2. A method according to claim 1, wherein the step of flipping the values of the at least two segments corresponding to a third region and a fourth region comprises the steps of:

mirroring values of the at least two segments about an axis dividing the first region from the third region to provide first third region mirrored values if the values of the at least two segments correspond to the third region;

mirroring the values of the at least two segments about an axis dividing the first region from the fourth region to provide first fourth region mirrored values if the values of the at least two segments correspond to the fourth region;

mirroring the first third region mirrored values so as to rotate the values about an axis midway between the first region and the third region to provide second third region mirrored values;

mirroring the first fourth region mirrored values so as to rotate the values about an axis midway between the first region and the fourth region to provide second fourth region mirrored values;

mirroring the second third region mirrored values so as to rotate the values about an axis diagonal across the first region; and mirroring the second fourth region mirrored values so as to rotate the values about an axis diagonal across the first region.

3. A method according to claim 1, further comprising the step of EXCLUSIVE ORing bit values from segments other than the at least two segments with the hash values.

4. A method according to claim 3, further comprising the step of:

determining a plurality of hash values for permutations of segments of the address values; and EXCLUSIVE ORing the plurality hash values together.

5. A method according to claim 4, further comprising the steps of cyclic shifting bits of the plurality of hash values prior to said EXCLUSIVE ORing step.

6. A method according to claim 3, further comprising the step of storing the values of the bits from other segments EXCLUSIVE ORed with the hash values as the complement of the hash value.

7. A method according to claim 3, wherein the address values are 32 bit address values and where the segments are four 8 bit segments.

8. A method according to claim 7, wherein a 16 bit hash value is determined and wherein the dividing, translating, flipping an utilizing steps comprise the steps of:

determining a 14 bit hash value (H[31] through H[18] utilizing the logical operations of:

H[31]=((g AND A[6]) XOR (f AND (NOT B[6]))) XOR C[6]
H[30]=((g AND A[5]) XOR (f AND (NOT B[5]))) XOR C[5]
H[29]=((g AND A[4]) XOR (f AND (NOT B[4]))) XOR C[4]
H[28]=((g AND A[3]) XOR (f AND (NOT B[3]))) XOR C[3]
H[27]=((g AND A[2]) XOR (f AND (NOT B[2]))) XOR C[2]
H[26]=((g AND A[1]) XOR (f AND (NOT B[1]))) XOR C[1]
H[25]=((g AND A[0]) XOR (f AND (NOT B[0]))) XOR C[0]
H[24]=((g AND B[6]) XOR (f AND (NOT A[6]))) XOR D[6]
H[23]=((g AND B[5]) XOR (f AND (NOT A[5]))) XOR D[5]
H[22]=((g AND B[4]) XOR (f AND (NOT A[4]))) XOR D[4]
H[21]=((g AND B[3]) XOR (f AND (NOT A[3]))) XOR D[3]
H[20]=((g AND B[2]) XOR (f AND (NOT A[2]))) XOR D[2]
H[19]=((9 AND B[1]) XOR (f AND (NOT A[1]))) XOR D[1]
H[18]=((g AND B[0]) XOR (f AND (NOT A[0]))) XOR D[0]

where f=A[7] XOR B[7] and g=NOT f and A[0] through A[7] are bits of one of a first of the four address segments, B[0] through B[7] are bits of a second of the four address segments, C[0] through C[7} are bits of a third of the four address segments and D[0] through D[7] are bits of a fourth of the four address segments; and wherein a remaining two bits of the 16 bit has value are determined utilizing the logical operations of H[17]= (D[1] XOR C[1]) XOR (D[7] XOR A[7]) and H[16]= (D[0] XOR C[0]) XOR (C[7] XOR B[7]).

9. A method according to claim 1, wherein said translating, said flipping and said utilizing steps comprise the steps of:

determining a first set of bits of the hash value based on the inverted bit values of a first segment of the at least two segments and a second set of bits of the hash value based on the inverted bits of a second segment of the at least two segments if either a most significant bit of the first segment or a most significant bit of the second segment is a logical 1 value: and utilizing bits of the first segment other than the most significant bit of the first segment as the first set of bits and bits of the second segment other than the most significant bit of the second segment as the second set of bits of the hash value if the most significant bit of the first segment and the most significant bit of the second segment have the same logical value.

10. A system for hashing an address comprised of a plurality of bit segments, the system comprising:

means for EXCLUSIVE ORing most significant bit values of at least a first bit segment and a second bit segment so as to provide a first gating value;

means for inverting the first gating value to provide a second gating value;

first means for ANDing the second gating value and each of remaining bits of the first and second bit segments respectively to provide first ANDed bit values corresponding to each of the remaining bits of the first and second bit segments;

second means for ANDing gates which AND the first gating value and inverted bit values of remaining bits of the first and second bit values to provide second ANDed bit values corresponding to each of the remaining bits of the first and second bit segments;

first means for EXCLUSIVE ORing first ANDed bit values corresponding to the first bit segment and second ANDed bit values corresponding to the second bit segment and which EXCLUSIVE OR first ANDED bit values corresponding to the second bit segement and second ANDed bit values corresponding to the first bit segment to provide first XOR values; and second means for EXCLUSIVE ORing the first XOR values and bit values of remaining bit segments of the address value so as to provide a plurality of hash bit values.

11. A system according to claim 10, wherein the means for EXCLUSIVE ORing most significant bit values comprises an EXCLUSIVE OR gate which EXCLUSIVE ORs most significant bit values of at least a first bit segment and a second bit segment so as to provide a first gating value;

wherein the means for inverting comprises an inverter for inverting the first gating value to provide a second gating value;

wherein the first means for ANDing comprises a first plurality of AND gates which AND the second gating value and each of remaining bits of the first and second bit segments respectively to provide first ANDed bit values;

wherein the second means for ANDing comprises a second plurality of AND gates which AND the first gating value and inverted bit values of remaining bits of the first and second bit values to provide second ANDed bit values;

wherein the first means for EXCLUSIVE ORing further comprises a first plurality of EXCLUSIVE OR gates which EXCLUSIVE OR first ANDed bit values corresponding to the first bit segment and second ANDed bit values corresponding to the second bit segment and which EXCLUSIVE OR first ANDed bit values corresponding to the second bit segment and second ANDed bit values corresponding to the first bit segment to provide first XOR values; and wherein the second means for EXCLUSIVE ORing comprises a second plurality of EXCLUSIVE OR gates which EXCLUSIVE OR the first XOR values and bit values of remaining bit segments of the address value so as to provide a plurality of hash bit values.

12. A system according to claim 10, further comprising:
third means for EXCLUSIVE ORing bit values from the remaining segments of the address and the most significant bits of the first bit segment and the second bit segment.

13. A system according to claim 12, wherein the third means for EXCLUSIVE ORing comprises a plurality of EXCLUSIVE OR gates.

14. A system according to claim 10, further comprising, means for determining a plurality of hash values sets comprised of the hash values and wherein the plurality of hash values sets comprise hash values based on permutations of the bit segments, the system further comprising:
means for EXCLUSIVE ORing the plurality of hash value sets.

15. A system according to claim 14, further comprising:
means for cyclically rotating hash values in the plurality of hash values sets prior to EXCLUSIVE Oring the plurality of hash values sets.

16. A system according to claim 15, wherein the means for cyclically rotating hash values comprises a shift register.

17. A system for hashing address values that exhibit banding in a plurality of regions of an address space defined by at least two segments of the address values, comprising:
means for dividing an address space defined by the at least two segments of the address values into at least four regions;

means for translating values of the at least two segments corresponding to a second region of the at least four regions to a first region of the at least four regions to provide hash values for address values if the values of the at least two segments correspond to the second region;

means for flipping the values of the at least two segments corresponding to a third region and a fourth region of the at least four regions into the first region to provide hash values for address values if the values of the at least two segments correspond to one of the third region and the fourth region and wherein the third region and the fourth region are regions other than the first and the second regions;

means for utilizing the translated and flipped at least two segments as hash values for address values; and means for selecting an action from a plurality of actions based on the mapped at least two segments.

18. A system according to claim 17, wherein the means for flipping the values of the at least two segments corresponding to a third region and a fourth region comprises:
means for mirroring values of the at least two segments about an axis dividing the first region from the third region to provide first third region mirrored values if the values of the at least two segments correspond to the third region;

means for mirroring the values of the at least two segments about an axis dividing the first region from the fourth region to provide first fourth region mirrored values ff the values of the at least two segments correspond to the fourth region;

means for mirroring the first third region mirrored values so as to rotate the values about an axis midway between the first region and the third region to provide second third region mirrored values;

means for mirroring the first fourth region mirrored values so as to rotate the values about an axis midway between the first region and the fourth region to provide second fourth region mirrored values;

means for mirroring the second third region mirrored values so as to rotate the values about an axis diagonal across the first region; and means for mirroring the second fourth region mirrored values so as to rotate the values about an axis diagonal across the first region.

19. A system according to claim 17, further comprising means for EXCLUSIVE ORing bit values from segments other than the at least two segments with the hash values.

20. A system according to claim 19, further comprising:
means for determining a plurality of hash values for permutations of segments of the address values; and
means for EXCLUSIVE ORing the plurality hash values together.

21. A system according to claim 20, further comprising means for cyclic shifting bits of the plurality of hash values prior to said EXCLUSIVE ORing step.

22. A system according to claim 19, further comprising means for storing the values of the bits from other segments EXCLUSIVE ORed with the hash values as the complement of the hash value.

23. A system according to claim 17, wherein said means for translating, said means for flipping and said means for utilizing comprise:
   means for determining a first set of bits of the hash value based on the inverted bit values of a first segment of the at least two segments and a second set of bits of the hash value based on the inverted bits of a second segment of the at least two segments if either a most significant bit of the first segment or a most significant bit of the second segment is a logical 1 value; and
   means for utilizing bits of the first segment other than the most significant bit of the first segment as the first set of bits and bits of the second segment other than the most significant bit of the second segment as the second set of bits of the hash value if the most significant bit of the first segment and the most significant bit of the second segment have the same logical value.

24. A computer program product for hashing address values that exhibit banding in a plurality of regions of an address space defined by at least two segments of the address values, comprising:
   a computer readable storage medium having computer readable program code means embodied in said medium, said computer-readable program code means comprising:
      computer-readable program code means for performing at least one of a translation and a rotation of the at least two segments to thereby map the at least two segments from the plurality of regions to one of the plurality of regions; and
      computer-readable program code means for selecting an action from a plurality of actions based on the mapped at least two segments;
      wherein said computer-readable program code means for performing further includes:
         computer-readable program code means for dividing an address space defined by the at least two segments of the address values Into at least four regions;
         computer-readable program code means for translating values of the at least two segments corresponding to a second region of the at least four regions to a first region of the at least four regions to provide hash values for address values if the values of the at least two segments correspond to the second region;
         computer-readable program code means for flipping the values of the at least two segments corresponding to a third region and a fourth region of the at least four regions into the first region to provide hash values for address values it the values of the at least two segments correspond to one of the third region and the fourth region and wherein the third region and the fourth region are regions other than the first and the second regions; and
         computer-readable program code means for utilizing the translated and flipped at least two segments as hash values for address values.

25. A computer program product according to claim 24, wherein the computer-readable program code means for flipping the values of the at least two segments corresponding to a third region and a fourth region comprises:
   computer-readable program code means for mirroring values of the at least two segments about an axis dividing the first region from the third region to provide first third region mirrored values if the values of the at least two segments correspond to the third region;
   computer-readable program code means for mirroring the values of the at least two segments about an axis dividing the first region from the fourth region to provide first fourth region mirrored values if the values of the at least two segments correspond to the fourth region;
   computer-readable program code means for mirroring the first third region mirrored values so as to rotate the values about an axis midway between the first region and the third region to provide second third region mirrored values;
   computer-readable program code means for mirroring the first fourth region mirrored values so as to rotate the values about an axis midway between the first region and the fourth region to provide second fourth region mirrored values;
   computer-readable program code means for mirroring the second third region mirrored values so as to rotate the values about an axis diagonal across the first region; and
   computer-readable program code means for mirroring the second fourth region mirrored values so as to rotate the values about an axis diagonal across the first region.

26. A computer program product according to claim 24, further comprising computer-readable program code means for EXCLUSIVE ORing bit values from segments other than the at least two segments with the hash values.

27. A computer program product according to claim 26, further comprising:
   computer-readable program code means for determining a plurality of hash values for permutations of segments of the address values; and
   computer-readable program code means for EXCLUSIVE ORing the plurality hash values together.

28. A computer program product according to claim 27, further comprising computer-readable program code means for cyclic shifting bits of the plurality of hash values prior to said EXCLUSIVE ORing step.

29. A computer program product according to claim 26, further comprising computer-readable program code means for storing the values of the bits from other segments EXCLUSIVE ORed with the hash values as the complement of the hash value.

30. A computer program product according to claim 24, wherein said computer-readable program code means for translating, said computer-readable program code means for flipping and said computer-readable program code means for utilizing comprise:
   computer-readable program code means for determining a first set of bits of the hash value based on the inverted bit values of a first segment of the at least two segments and a second set of bits of the hash value based on the inverted bits of a second segment of the at least two segments if either a most significant bit of the first segment or a most significant bit of the second segment is a logical 1 value; and
   computer-readable program code means for utilizing bits of the first segment other than the most significant bit of the first segment as the first set of bits and bits of the second segment other than the most significant bit of the second segment as the second set of bits of the hash value if the most significant bit of the first segment and the most significant bit of the second segment have the same logical value.

31. A method of hashing address values that exhibit banding in a plurality of regions of an address space defined by at least two segments of the address values, the method comprising the steps of:

performing at least one of a translation and a rotation of the at least two segments to thereby map the at least two segments from the plurality of regions to one of the plurality of regions; and exclusively ORing (X ORing) bits from segments mapped into the one of the plurality of regions.

32. A system for hashing address values that exhibit banding in a plurality of regions of an address space defined by at least two segments of the address values, comprising:

means for performing at least one of a translation and a rotation of the at least two segments to thereby map the at least two segments from the plurality of regions to one of the plurality of regions; and means for exclusively ORing (X ORing) bits from segments mapped into the one of the plurality of regions.

33. A computer program product for hashing address values that exhibit banding in a plurality of regions of an address space defined by at least two segments of the address values, comprising:

a computer readable storage medium having computer readable program code means embodied in said medium, said computer-readable program code means comprising:

computer-readable program code means for performing at least one of a translation and a rotation of the at least two segments to thereby map the at least two segments from the plurality of regions to one of the plurality of regions; and computer readable code means for exclusively ORing (X ORing) bits from segments mapped into the one of the plurality of regions.

34. A method of hashing address values that exhibit banding in a plurality of regions of an address space defined by at least two segments of the address values, the method comprising the steps of:

performing at least one of a mathematical translation and a mathematical reflection of the at least two segments to thereby map the at least two segments from the plurality of regions to one of the plurality of regions; and exclusively ORing (X ORing) bits from segments mapped into the one of the plurality of regions.

35. A method of hashing address values comprising:

performing at least one translation of a generally void region and rotations on regions characterized by bands to generate values of a hash function; and performing Exclusive OR bitwise of any remaining address bits and bits of the hash function.

36. A method according to claim 35, further comprising:

selecting an action from a plurality of actions based on a mapped at least two segments.

37. A method according to claim 36, wherein the plurality of actions are data network routing actions.

* * * * *